No. 847,472. PATENTED MAR. 19, 1907.
J. N. HAFER.
PIPE COUPLING.
APPLICATION FILED JULY 3, 1906.
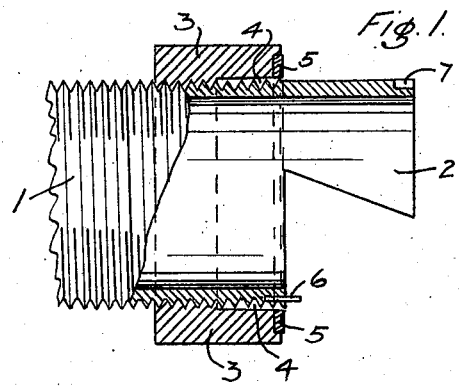
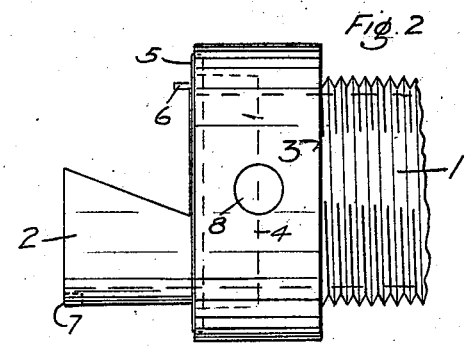
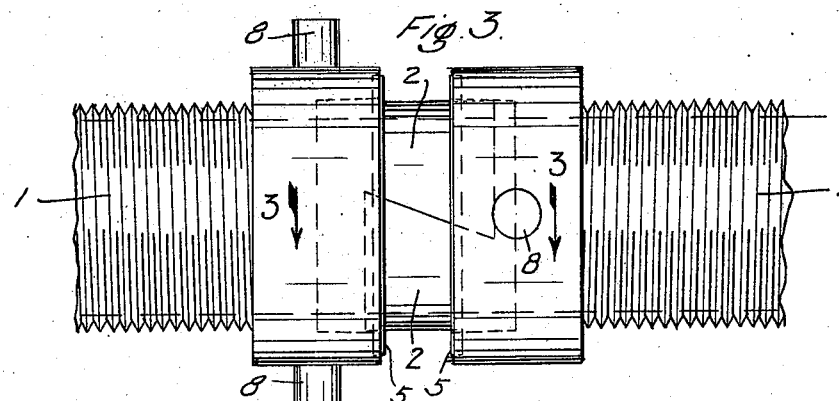
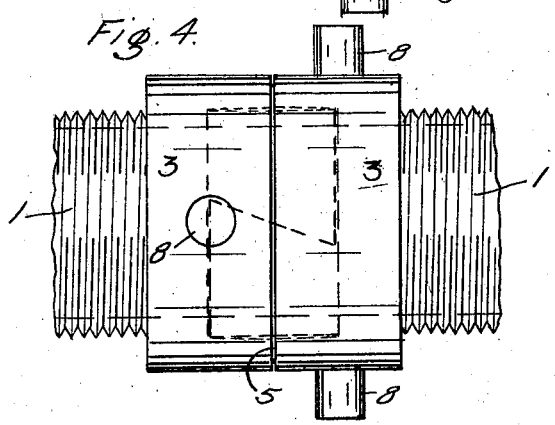
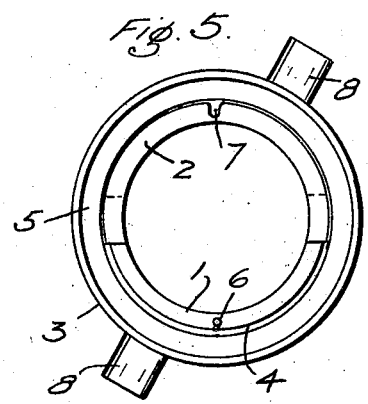
Witnesses
Inventor
Jasper N. Hafer
By
Attorney

UNITED STATES PATENT OFFICE.

JASPER N. HAFER, OF TACOMA, WASHINGTON.

PIPE-COUPLING.

No. 847,472.  Specification of Letters Patent.  Patented March 19, 1907.

Application filed July 3, 1906. Serial No. 324,679.

*To all whom it may concern:*

Be it known that I, JASPER N. HAFER, a citizen of the United States of America, residing at Tacoma, in the county of Pierce and State of Washington, have invented certain new and useful Improvements in Pipe-Couplers, of which the following is a specification, reference being had therein to the accompanying drawing.

This invention relates to pipe-couplers, and has for its objects to enable a coupling to be made with great speed, even in the dark, and being interchangeable it is not necessary to pay any attention as to which ends of the hose are being connected together.

My device will be principally used for making connections between a hydrant and a hose, between the various lengths of hose, and between the hose and nozzle. In the drawings, however, I have illustrated simply those portions of the couplers which engage each other, without indicating to what bodies they are attached.

In the drawings, Figure 1 is a partial section of my improved coupler. Fig. 2 is a side view thereof. Fig. 3 shows a pair of couplers placed in position and being secured together. Fig. 4 is a similar view showing the coupling completed, and Fig. 5 is an end view of my improved coupling.

Similar numerals of reference refer to similar parts throughout the several views.

The pipe 1 is screw-threaded from the end at which it is secured to the hose or other body to the coupling-lip 2. This lip 2 extends out from the screw-threaded part of the pipe and is formed in one piece therewith and has a slightly greater diameter at its end than has the pipe proper. The lip 2 is formed in such manner as to be symmetrical about the central cross-plane of the couplings, its outer surface extending down beyond the central horizontal plane, while its inner surface, which is the end of the pipe 1, extends an equal distance on the other side of said central horizontal plane, the two said surfaces being joined by a straight cut crossing said plane at an angle and forming a dovetail lip. Since all the couplings are the same, the lip of one enters under the lip of the other and makes a complete pipe at their overlapping parts, and since the longitudinal cut of the lips is at an acute angle to the ends thereof the said lips cannot pull past each other without becoming of greater diameter than the pipe. Hence all that is necessary to make this coupling complete is to bind the lips together around their circumference. This I do by screwing a collar 3 on each pipe 1, said collar having in its outer end a cavity 4, formed by cutting away the threads. The cavity 4 is slightly conical, being larger in diameter at its outer end. The recess 4 is deep enough to cover one-half of the length of the lip. The collar 3 is also countersunk on its outer face to receive a gasket 5, made of rubber or other suitable material. A small pin or dowel 6 is inserted in the end of the pipe 1 at the lowest point thereof, as viewed in Fig. 1, and a corresponding slot 7 is made in the end of the lip 2 diametrically opposite to the pin 6. It will be seen from the above that the collar 3 screws readily on the pipe 1 and that when it is screwed toward the end of the coupling the cavity 4 extends over without touching the lip 2 of the pipe on which the collar 3 is screwed, but the lip 2 of the other pipe enters the cavity 4, and since it is of slightly greater diameter at its end the conical surface of the cavity soon engages it and forces it toward the center of the pipe, thus binding the lips together and preventing the pipes from being pulled apart, as above mentioned. The coupling could be made with a single collar on one pipe alone; but in order to make all the connections the same and the joint water-tight I prefer to provide a collar with each pipe 1. In order to make the connection in the dark and also to increase the speed of making the connection, I have provided the above-described dowel 6 and slot 7. Each of the collars 3 is provided with suitable lugs or ears 8, which may be engaged by a suitable wrench, by which the collar 3 may be turned to complete the couplings.

A coupling is made, therefore, in the following manner: The collars 3 are screwed back from over their respective lips 2. Then the pair of lips are brought so as to overlap each other, the dowel 6 of one entering the slot 7 of the other, thus bringing them in line transversely. Then one of the collars 3 is rapidly screwed on its pipe 1, so that it will extend over and around the end of the complementary lip 2. At the same time the other collar 3 is also screwed on its pipe 1 to extend over and around its complementary lip 2. Since the cavities 4 are conical, the collars 3 move easily for the first part of the process of making the coupling. At this point if the hose is used in connection with a fire-engine the signal may be given for turning on the water, since the connection cannot be pulled apart. Then a wrench is applied to the collars, and they are each screwed so that they will meet in the center of a coupling, compressing the gaskets 5 between them. It will be observed that in Figs. 1 and 2 a right-handed screw is shown, in Fig. 3 one right-handed screw and one left-handed screw is shown, while in Fig. 4 the screws are both left-handed. I have illustrated the screws in this way to call attention to the fact that it is immaterial whether the screw-threads of two couplings which are being joined together have like or unlike threads and whether these threads are right-handed or left-handed. If anything, there is a slight advantage in having the threads unlike, since the collars would then be both turned in the same direction to make a coupling, as shown in Fig. 3.

Having described my invention, what I claim is—

1. In a pipe-coupling, the combination of screw-threaded pipes, similar complementary dovetail extensions thereof, hollow collars screwed on said pipes and having cavities therein adapted to extend half-way over said extensions and to bind them together, and dowel-pins in the ends of said extensions and engaging in complementary slots in the ends of said pipes.

2. In a pipe-coupling, the combination of screw-threaded pipes, similar complementary dovetail extensions thereof, hollow collars screwed on said pipes and having conical cavities therein adapted to extend half-way over said extensions, and dowel-pins in the ends of said extensions and engaging in complementary slots in the ends of said pipes.

In testimony whereof I affix my signature in presence of two witnesses.

JASPER N. HAFER.

Witnesses:
M. H. COREY,
G. K. McNERNEY.